Jan. 15, 1957   L. L. JOHNSON ET AL   2,777,210
TOOL SETTING GAUGE
Filed June 8, 1953
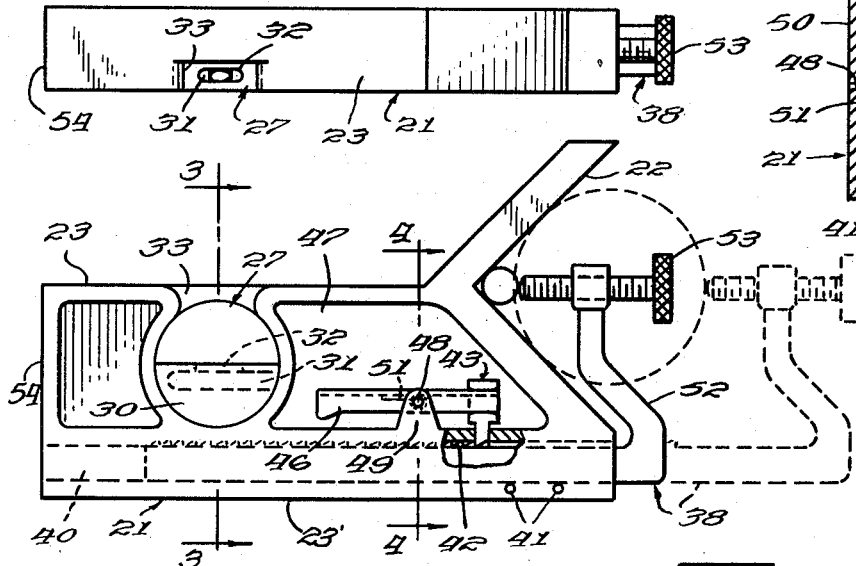
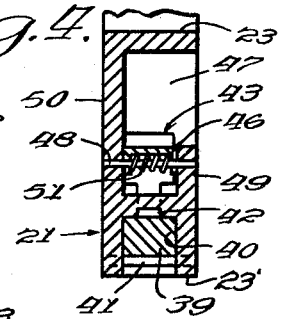
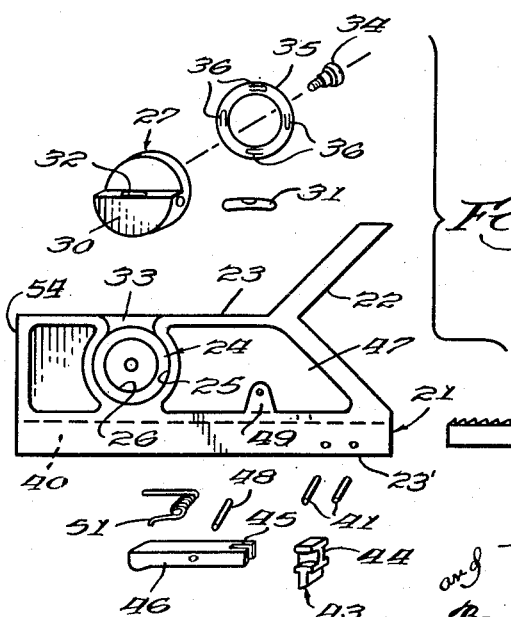
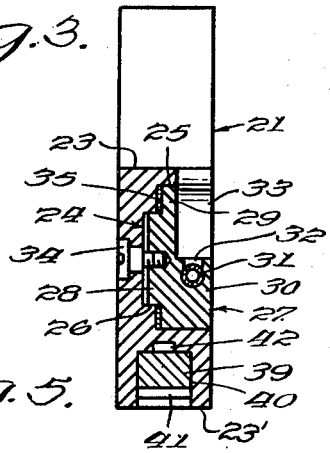
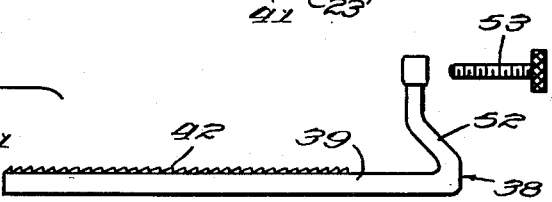
Inventors:
Lester L. Johnson
and Charles W. Downs.
By Harold J. L. Visconte
Atty.

2,777,210

TOOL SETTING GAUGE

Lester L. Johnson, Tujunga, and Charles W. Downs, Sun Valley, Calif.

Application June 8, 1953, Serial No. 360,276

3 Claims. (Cl. 33—185)

This invention relates to tool setting gauges and particularly to a device for setting a lathe tool or the like in proper relation to the centerline of a rotatable work piece.

In the operation of lathes, screw machines, and other metal turning machines it is necessary that the cutting edge be set to move toward the axis of the work piece on a line which will intersect the axis of the work which line must be parallel to the plane of movement of the slide on which the tool is mounted. Often it is necessary to change a tool bit while the work piece is still in the machine and this deprives the operator from access to the centers of the lathe or other reference means which would otherwise be available. The present invention is directed to a means for correctly setting the tool point at the proper elevation by reference to the work piece itself and the principal object of the invention is to provide a tool setting gauge which may be mounted on the surface of a circular work piece in a machine tool and which includes means for locating a tool point for movement in a plane parallel to the ways on which the tool moves toward and away from the axis of the work and which plane intersects the axis of rotation of the work piece.

Another object of the invention is to provide a tool setting gauge which will permit the setting of a lathe tool or the like with reference to the work piece and to the plane of movement of the tool point toward and away from the axis of rotation of the work piece.

Still another object of the invention is to provide a tool setting gauge in which the foregoing objectives are realized and in which compensation can be made for any departure from the horizontal in the setting of the machine tool may be accommodated.

A further object of the invention is to provide a tool setting gauge for determining the correct position of the tool point relative to a rotatable work piece and in which the setting is determined by reference to the work piece.

A still further object of the invention is to provide a tool setting gauge in which the foregoing objects are realized in practice, which may be used on a wide range of diameters of work, which is simple in construction, and which is readily applied to the work piece and which is reliable in use.

With the foregoing objects in view, together with such additional objects and advantages as may subsequently appear, the invention resides in the parts, and in the construction, combination and arrangement of parts, disclosed by way of example in the following specification of one mode of execution of the invention; reference being had to the accompanying drawings, which form a part of said specification and in which drawings:

Fig. 1 is a side elevation of a form of the invention adapted to uses on tools moving toward and from the work at any angle, portions being broken away to disclose interior construction, Fig. 2 is a top plan view of the gauge shown in Fig. 1, Figs. 3 and 4 are transverse sectional views taken on the lines 3—3 and 4—4, respectively, of Fig. 1, and Fig. 5 is an exploded view of the component parts of the form of the device shown in Fig. 1.

Referring to the embodiment of the invention shown in the drawings, the gauge comprises a base member 21 having a work piece engaging V-shaped end 22, a tool position indicating surface 23 disposed in parallelism with the base surface 23' and in a plane bisecting the angle of the end 22 and a circular socket portion 24 disposed beneath the surface 23 and including a larger diameter portion 25 and a concentrically disposed smaller diameter portion 26. Freely rotatable in the socket portion 24 is a cylindrical, level glass carrying member 27 having a smaller diameter portion 28 engaging the diameter 26 of the socket and a larger diameter portion 29 engaging the larger diameter portion 25 of the socket. The large diameter portion 29 includes an outwardly projecting ledge portion 30 in which a level glass 31 is mounted and the top surface of the ledge portion is provided with an opening 32 through which the mid portion of the level glass may be observed. Preferably also, the side of the tool position indicating surface 23 is cut away as at 33 to permit direct observation of the level glass. A shoulder screw 34 passing through the base member and engaging the member 27 holds the member in the socket 24 and a spring washer 35 having a series of tongues 36 is positioned between the adjacent end surfaces of the member 27 and socket 24 to frictionally hold the member 27 in any position to which it may be moved in the socket.

The means for mounting the gauge on a work piece comprises a clamping member 38 having a slide portion 39 mounted in a longitudinally extending groove 40 formed in the under surface of the base member 21; said slide portion and groove having parallel flat sides to prevent turning of the slide therein. A pair of transverse pins 41, 41 hold the slide portion in the groove. The upper surface of the slide portion 39 is provided with a longitudinally extending series of rachet teeth 42 engaged by one end of a detent 43 having a narrowed portion 44 adjacent the other end thereof loosely fitting a slot 45 in one end of a lever 46 disposed within a recess 47 formed in the side of the base member 21 and pivotally mounted adjacent its mid length on a pivot pin 48 extending between a lug 49 and the rear wall 50 of the recess 47. A torsion spring 51 surrounding the pivot pin 48 and having one end thereof engaging the lever 46 and the other end engaging the base member operates to bias the lever in a clockwise direction as viewed in Fig. 7 and hence to keep the detent 43 bearing downwardly on the rachet teeth 42. The opposite end of the lever 46 serves as a manually engageable portion to operate the lever against the bias of the spring 51 to release the engagement of the detent with the rachet teeth. The clamping member 38 extends beyond the end of the base member and is provided with an upwardly extending arm portion 52 carrying a thumb screw 53 disposed on the plane of the bisector of the angle of the end 22 of the base member and manually operable to effect clamping of the gauge to a work piece.

In use, the gauge is first placed on a surface of the machine tool known to be parallel to the direction of movement of the tool slide (usually a surface of the tool slide) and the level glass is then rotatably adjusted until it indicates a level position. The gauge is then clamped to the work piece by movement of the clamping member into the base member and by the screw 53; the engagement of the teeth 42 by the detent 43 being such as to permit the member 38 to be moved into the base member but to be moved outwardly only upon release by operation of the lever 46, and after the work piece and gauge are rotated until the level glass is brought to indicate a level position at the setting thereof first made, the tool is set with its point flush with the surface 23 of the base member with resultant positioning of the tool point in a plane coincident with the axis of rotation of the work piece and parallel to the direction of movement of the tool slide.

Additionally, the end 54 of the gauge body opposite the end 22 is disposed at right angles to the surface 23 thereby, in the case of box tools, making it possible to hold the end 54 against the tool holder of the box tool while initially adjusting the level glass to level position. When the adjustment of the level glass is achieved, the gauge is transferred to the work piece and the tool point is adjusted to the surface 23 as previously described.

This form of the invention may be used for setting tools mounted on tool slides disposed at any angle for operation on work rotating about a horizontal axis and therefore is adapted for use on many locations in automatic screw machines.

While in the foregoing specification a presently preferred embodiment of the invention has been disclosed, it is not to be inferred therefrom that the invention is limited to that specific form, and it is to be understood that the invention includes as well all such changes and modifications in the parts and in the construction, combination and arrangement of parts as shall come within the purview of the appended claims.

We claim:

1. In a tool setting gauge for machine tools, a gauge body having a V-shaped, work piece engaging end surface and a clamp means opposing said end surface operable to secure said gauge body to a cylindrical work piece, a tool point position indicating surface on said gauge body disposed in a plane bisecting the angle of said V-shaped end surface, a second flat surface on said gauge body and disposed in parallelism with said tool point position indicating surface, a cylindrical socket formed in one side of said gauge body and comprising an outer larger diameter portion generated about an axis parallel with the plane of said tool point position indicating surface, an inner smaller diameter portion concentrically disposed with respect to the axis of said larger diameter portion, and a shoulder portion disposed between said larger and smaller diameter portions, a level glass holding means mounted for rotation in said socket and comprising concentric larger and smaller diameter portions respectively fitting said larger and smaller diameter portions of said socket, and a shoulder on said holding means connecting said larger and smaller diameter portions and opposing said shoulder in said socket, a level glass carried by said holding means, and means extending through said gauge body from the side thereof opposite the side in which said socket is formed and engaging said holding means and effective to retain said holding means in said socket while permitting rotation of said holding means in said socket.

2. A tool setting gauge as claimed in claim 1 in which a washer having laterally extending spring tongue elements is interposed between the shoulder portions of said socket and said holding means effective to frictionally resist rotation of said holding means in said rocket.

3. A tool setting gauge as claimed in claim 1 in which the end of said gauge body opposite said V-shaped end is disposed at right angles to said tool point positioning surface with resultant capacity of said gauge to be adjusted with reference to surfaces parallel to or at right angles to the direction of tool travel.

References Cited in the file of this patent

UNITED STATES PATENTS

| | | |
|---|---|---|
| 92,927 | Amory | July 27, 1869 |
| 657,443 | Newton | Sept. 4, 1900 |
| 1,224,836 | Blainer | May 1, 1917 |
| 2,125,682 | Meluzin | Aug. 2, 1938 |
| 2,164,825 | Lack | July 4, 1939 |

FOREIGN PATENTS

| | | |
|---|---|---|
| 549,271 | Great Britain | Nov. 13, 1942 |
| 907,317 | France | Mar. 8, 1946 |